United States Patent
Sato et al.

(10) Patent No.: US 8,638,067 B2
(45) Date of Patent: Jan. 28, 2014

(54) COLD END SWITCH BATTERY MANAGEMENT CONTROL METHOD

(75) Inventors: Tetsuo Sato, San Jose, CA (US); Tsutomu Kawano, Sagamihara (JP); Koji Kashimoto, Hino (JP); Takao Hidaka, Machida (JP); Tsuyoshi Ota, Chofu (JP); Ryoji Kato, Tokyo (JP)

(73) Assignee: Renesas Electronics America Inc., Santa Clara, CA (US)

( * ) Notice: Subject to any disclaimer, the term of this patent is extended or adjusted under 35 U.S.C. 154(b) by 321 days.

(21) Appl. No.: 13/227,776

(22) Filed: Sep. 8, 2011

(65) Prior Publication Data

US 2013/0063093 A1    Mar. 14, 2013

(51) Int. Cl.
*H01M 10/44*    (2006.01)
*H01M 10/46*    (2006.01)

(52) U.S. Cl.
USPC .......................................................... 320/134

(58) Field of Classification Search
USPC .................................................. 320/134, 136
See application file for complete search history.

(56) References Cited

U.S. PATENT DOCUMENTS

2008/0239603 A1 *   10/2008   Bruce et al. ..................... 361/84

* cited by examiner

*Primary Examiner* — Edward Tso
(74) *Attorney, Agent, or Firm* — Campbell Stephenson LLP (57) ABSTRACT

In one embodiment of the cold end switch battery management control method, a battery generates an output voltage at a positive terminal thereof. A first control voltage is also generated by an integrated circuit. A gate of a field effect transistor (FET) receives the first control voltage, wherein the FET comprises a drain and a source with the source coupled to a negative terminal of the battery. The FET transmits current towards the battery in response to the gate receiving the first control voltage, wherein the first control voltage is greater than the output voltage, and wherein the first control voltage is less than a breakdown voltage of the integrated circuit.

21 Claims, 8 Drawing Sheets

COLD END SWITCH BATTERY MANAGEMENT CONTROL METHOD

BACKGROUND OF THE INVENTION

Mobile devices including smart phones, laptop computers, tablet computers, etc., can be powered by rechargeable battery packs that contain one or more rechargeable batteries such as lithium ion batteries. Lithium ion batteries provide several advantages and disadvantages over other types of rechargeable batteries. Lithium ion batteries tend to be lighter, provide higher energy densities, and have a slower loss of charge when not in use. On the other hand, if overcharged, lithium ion batteries may combust. Further, a deep discharge of lithium ion batteries below a voltage threshold (e.g., 2.4 volts-2.8 volts per cell, depending on the chemistry) may result in a dead battery.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Figure 1:
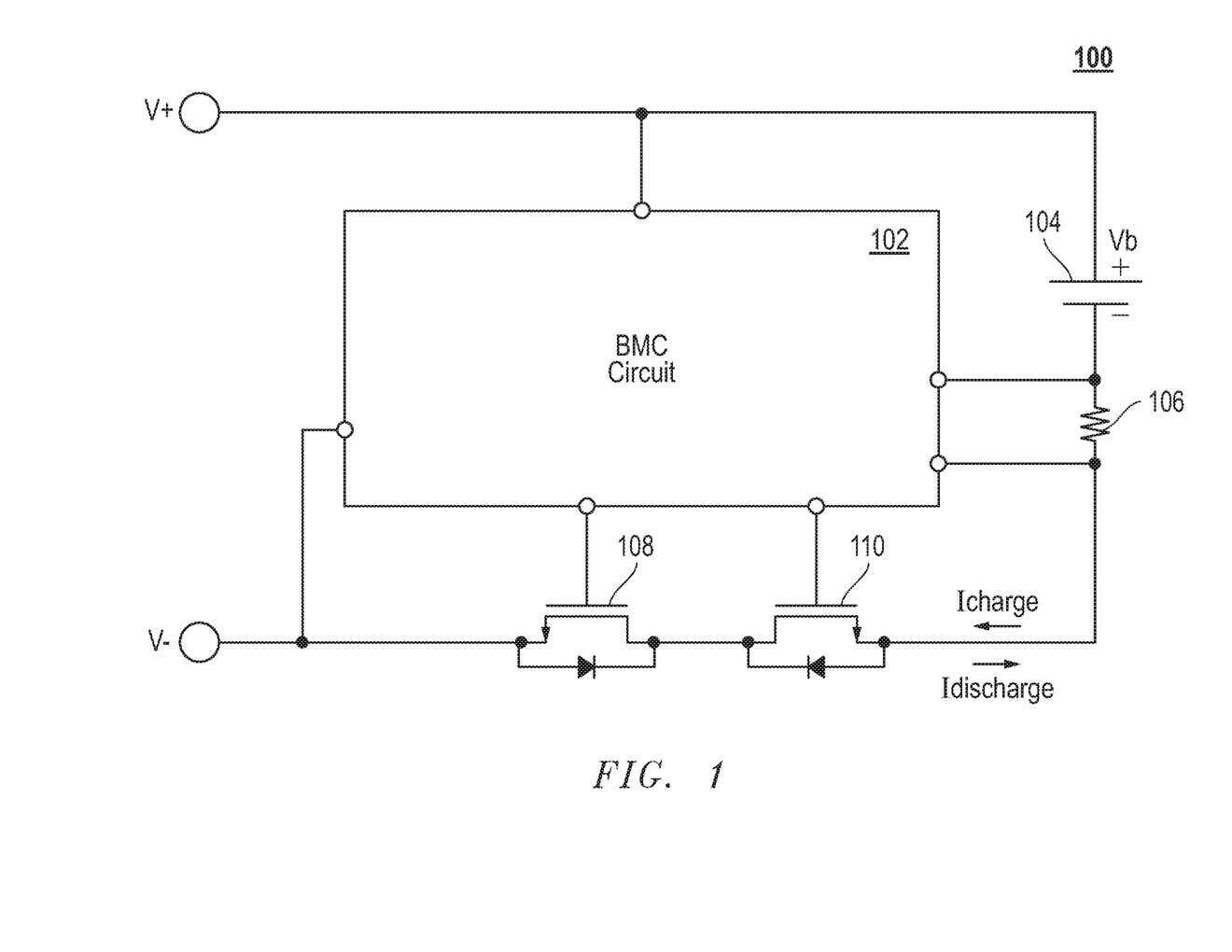
FIG. 1 is a block diagram illustrating an example battery pack.

FIG. 1 illustrates in block diagram form, relevant components of an example rechargeable battery pack 100 that can power a mobile device such as a smart phone (not shown). Battery pack 100 includes a battery management and control (BMC) circuit 102, a lithium ion battery cell (hereinafter battery) 104, a sense resistor 106, and transistors 108 and 110 that are cascade connected in the "cold end" or the portion of the current loop between the negative terminal of battery 104 and V− of battery pack 100.

BMC circuit 102 may take form in one integrated circuit formed on a single substrate or multiple integrated circuits formed on respective substrates. For purposes of explanation only, BMC circuit 102 is presumed to be formed on a single substrate. The present invention will be described with reference to a battery pack that contains a single, rechargeable lithium ion battery or cell, it being understood that the present invention should not be limited thereto. Also for purposes of explanation only, transistors 108 and 110 will take form in n-channel, metal oxide semiconductor field effect transistors (MOSFETs). N-channel MOSFETs have a lower source to drain ON resistance when compared to p-channel MOSFETS.

BMC circuit 102 can monitor, manage, and control battery cell 104. For example, BMC circuit 102 can monitor current flow into or out of a battery cell 104 while it is being charged or discharged. Excessive current flow can damage battery cell 104. If the monitored current flow exceeds a predetermined value, BMC circuit 102 can deactivate or turn off transistor 108 and/or 110. BMC circuit 102 can also monitor the voltage of battery 104 to ensure that it does not fall outside a range, which is presumed to be 2.5-4.2 volts, while battery 104 is being charged or discharged. If BMC circuit 102 determines that battery voltage Vb exceeds 4.2 volts or is less than 2.5 volts, BMC circuit 102 can deactivate transistor 108 and/or 110. Additional functions of BMC circuit 102 are contemplated.

BMC circuit 102 activates (i.e., turns on) transistor 108 and/or transistor 110 by applying a gate voltage that exceeds a threshold value. The present invention will be described with reference to BMC circuit 102 activating transistor 110 while battery 104 is being discharged, it being understood that the present invention should not be limited thereto. When active, the transistor 110 can transmit discharge current between its source and drain.

A resistance Rdson to current flow exists between the drain and source of transistor 110. The magnitude of Rdson is dependent upon several factors including the magnitude of the voltage applied to the gate. A lower gate voltage can increase Rdson and vice versa. As will be more fully described, Rdson may adversely affect operational aspects of battery pack 100.

BMC circuit 102 can activate transistor 110 by simply connecting Vb, the voltage of battery 104, to the gate. In this configuration, however, Vb may decrease from its upper limit of 4.2 volts to its lower limit of 2.5 volts while battery 104 discharges. The decrease in voltage may increase Rdson, which increases power consumed by transistor 110, which in turn reduces the power that can provided to the mobile device. An increase in Rdson also increases the voltage drop across active transistor 110, which effectively reduces the magnitude of the output voltage of across V+ and V−.

To reduce adverse effects associated with Rdson, BMC circuit 102 may include one or more sub-circuits that generate and apply a voltage Vd to the gate of transistor 110. Vd may exceed Vb, the voltage of battery 104. However, there may be limits on Vd. BMC circuit 102 may have an absolute maximum voltage that should not be exceeded during operation. BMC circuit 102 may be fabricated using a standard complementary metal-oxide-semiconductor (CMOS) process that has an intrinsic breakdown voltage associated with it. If the breakdown voltage is exceeded, permanent damage may result to one or more of devices (e.g., diodes, transistors, etc.) of the circuit. A manufacturer of an integrated circuit, such as BMC 102, may specify an absolute maximum voltage or breakdown voltage that can be applied. Vd, the voltage generated by BMC circuit 102, should not exceed the breakdown voltage.

Figure 2A:
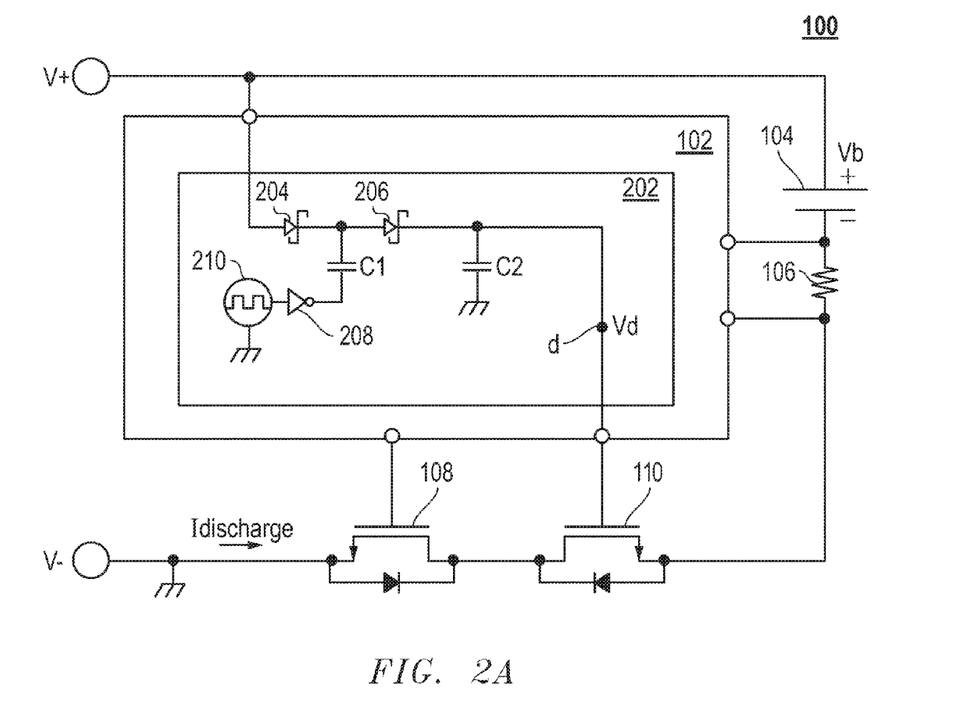
FIG. 2A illustrates in block diagram relevant components of an example Gate Drive: GD circuit that can be employed in the battery management control (BMC) circuit of FIG. 1.

The figures below illustrate relevant components of example gate driver (GD) circuits that can be employed in BMC circuit 102 for generating and applying Vd to the gate of transistor 110. The voltage generated by the GD circuit may also be applied to the gate of transistor 108, or alternatively the gate of transistor 108 may be controlled by a voltage generated by a separate, but similar or identical GD circuit. FIG. 2A shows in block diagram relevant components of GD circuit 202. GD circuit 202 has an input coupled to battery 104 and an output node "d" coupled to the gate of transistor 110.

GD circuit 202 includes capacitors C1 and C2 coupled to Schottky diodes 204 and 206, respectively, as shown. The input to diode 204 is coupled to Vb, while the output of diode 206 is coupled to capacitor C2 and output node d. Capacitor C1 is coupled to an output of inverter 208, which is driven by oscillator 210, which in turn generates a square wave with a voltage that varies between ground and Vb. Although not shown, another component of BMC circuit 102 may deactivate transistor 110 when, for example, Vb drifts outside a predetermined voltage range, which for the purposes of this explanation will be 2.5 volts-4.2 volts.

GD circuit 202 employs a type of charge pump, which is a DC-to-DC converter that uses one or more capacitors as energy storage elements to create an output voltage (e.g., Vd) that is higher than an input voltage (e.g., Vb). Usually, charge pump circuits use some form of switching device to control the connection of an input voltage to a capacitor. For example, a two-stage cycle can be used. In the first stage of the cycle, a capacitor is connected across a supply that provides the input voltage, thereby charging the capacitor to that same voltage. In the second stage of the cycle, the charge pump circuit is reconfigured so that the same capacitor is in series with the supply voltage, effectively doubling the voltage at a terminal of the capacitor.

Figure 2B:
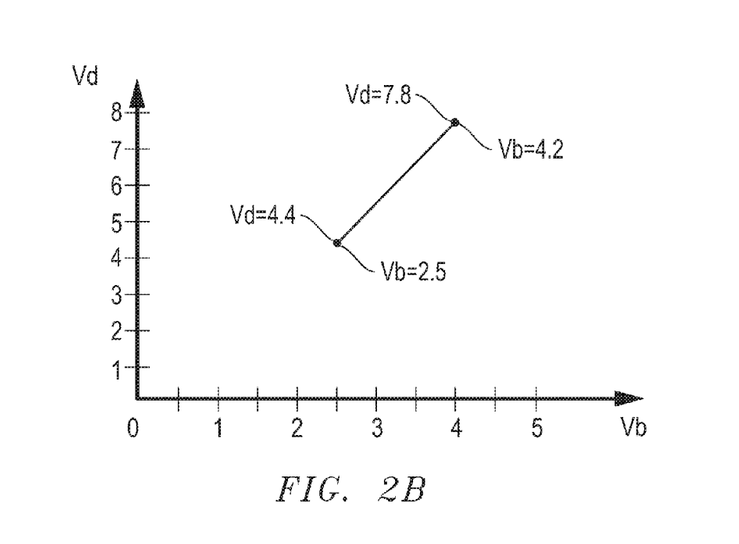
FIG. 2B graphically illustrates voltage Vd generated by the GD circuit of FIG. 2A.

GD circuit 202 can generate voltage Vd at output node d that is greater in magnitude than battery voltage Vb. Specifically, GD circuit 202 can generate Vd=2Vb−2Vf, where Vf represents a voltage drop (approximately 0.3 volts) across Schottky diode 204 or 206. FIG. 2B graphically illustrates the relationship between Vd and Vb for the range 2.5 volts-4.2 volts. Since the gate of transistor 110 is driven by Vd=2Vb−2Vf, Rdson of transistor 110 should be lower than it would be if the gate was driven only by Vb. A lower Rdson results in a lower voltage drop across transistor 110 in addition to a lower consumption of power by transistor 110. Unfortunately, if Vb is approximately 3.5 volts or greater, GD circuit 202 may generate Vd with a magnitude that exceeds the breakdown voltage (e.g., 6.5 volts) for BMC circuit 102.

Figure 3A:
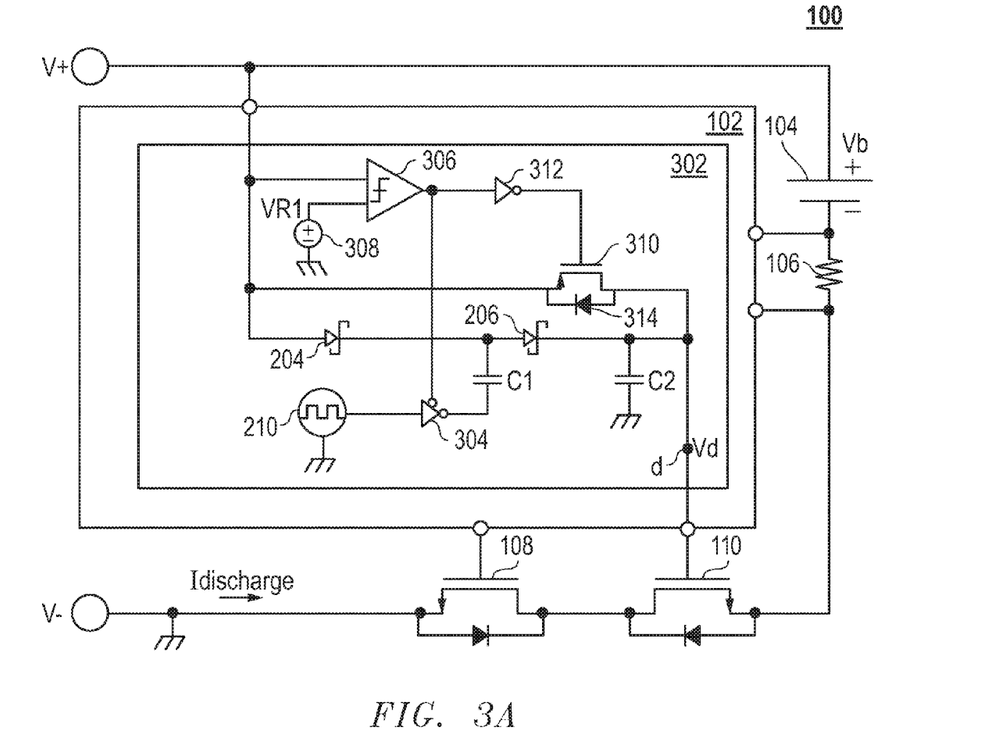
FIG. 3A illustrates in block diagram relevant components of an example GD circuit that can be employed in the BMC circuit of FIG. 1.

FIG. 3A illustrates another GD circuit 302 that could be employed in the BCM circuit 102 of FIG. 1. GD circuit 302 operates in one of two different modes depending on the magnitude of Vb. When Vb is greater than a reference voltage VR1, GD circuit 302 operates in the first mode and generates Vd=Vb, which does not exceed the breakdown voltage. When Vb is below the reference voltage VR1, GD circuit 302 operates in the second mode and generates Vd=Vb+Vf. (herein Vf is forwarding voltage of body diode (314) of p-ch MOSFET (310)). Because BMC circuit 102 limits Vb to the range of 2.5 volts-4.2 volts, Vd will not exceed the breakdown voltage of 6.5 volts in either the first or second mode of operation.

Figure 3B:
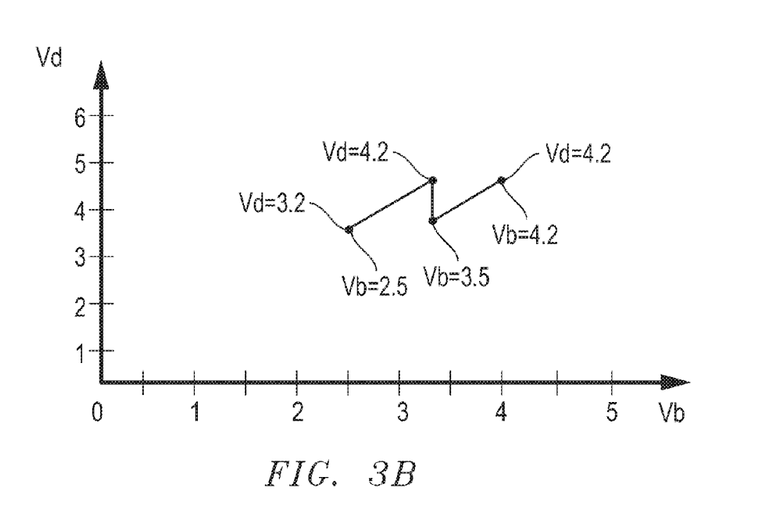
FIG. 3B graphically illustrates voltage Vd generated by the GD circuit of FIG. 3A.

GD circuit 302 includes several components of GD circuit 202, such as diodes 204 and 206, capacitors C1 and C2, and oscillator 210. A comparator 306 compares Vb with reference voltage VR1 (presumed to be 3.5 volts). If Vb is greater than a reference voltage VR1=3.5 volts, the output of comparator 306 is driven high, which in turn activates p-channel, metal oxide field effect transistor 310 via inverter 312 and deactivates inverter 304. In this first mode of operation, GD circuit 302 generates Vd=Vb. The second mode of operation is triggered when Vb drops below VR1. More particularly, when Vb falls below the reference voltage VR1=3.5 volts, the output of comparator 306 will be driven low, which in turn deactivates transistor 310 via inventor 312, and activates inverter 304. In this mode, the body diode 314 of transistor 310 acts as a clamp, and GD circuit 302 generates Vd=Vb+0.7. FIG. 3B graphically illustrates the relationship between Vd and Vb in both modes of operation. This graph shows the effect of transition between modes when Vb drops below VR1=3.5 volts. VR1 should be selected to be at the lower range of voltages that can activate transistor 110 with an acceptably low Rdson (e.g., a Rdson that doesn't, for example, consume too much power when the discharge current Idischarge flows).

Figure 4A:
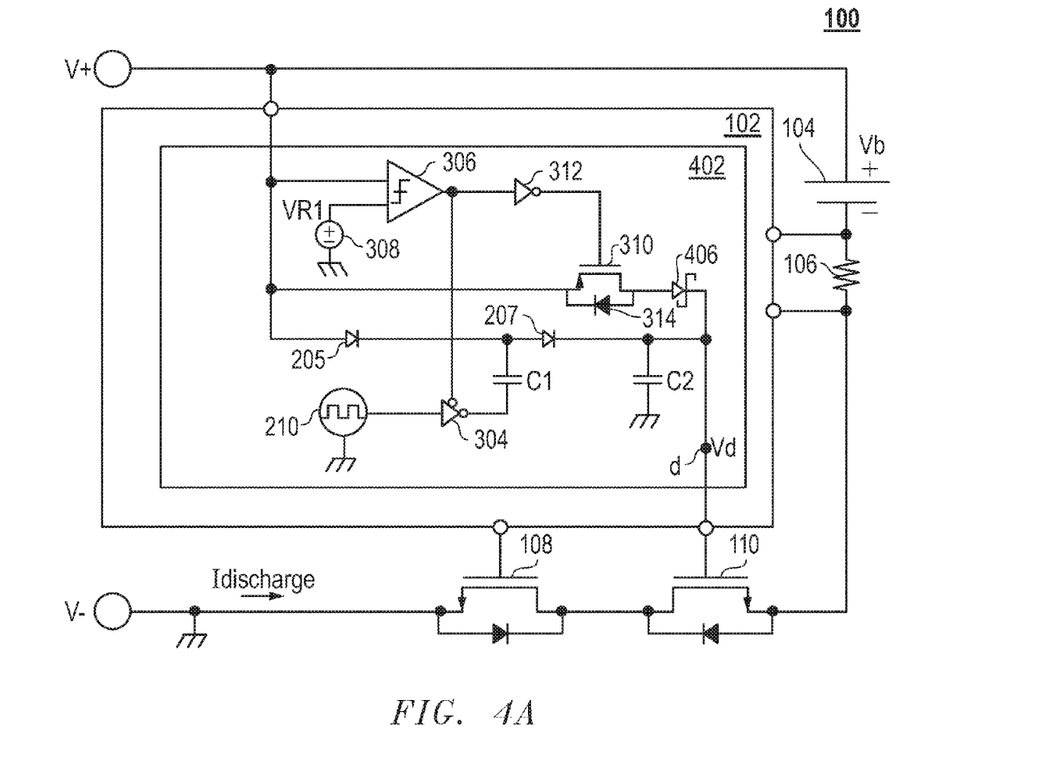
FIG. 4A illustrates in block diagram relevant components of an example GD circuit that can be employed in the BMC circuit of FIG. 1.
Figure 4B:
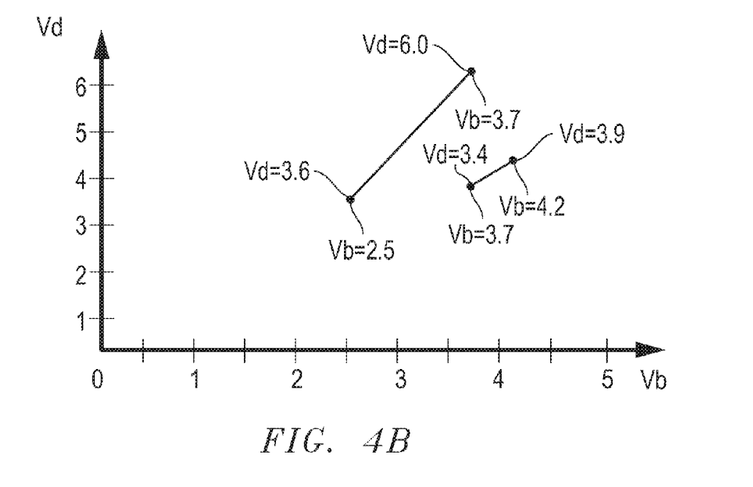
FIG. 4B graphically illustrates voltage Vd generated by the GD circuit of FIG. 4A.

FIG. 4A illustrates another GD circuit 402 that could be employed in the BCM circuit 102 of FIG. 1. GD circuit 402 is similar to GD circuit 302 with Schottky diodes 204 and 206 replaced with normal PN junction diodes 205 and 207. In FIG. 4A, GD circuit 402 includes a Schottky diode 406 coupled between output d and transistor 310, and the reference voltage VR1 is increased to VR1=3.7 volts. Schottky diode 406 prevents the clamp circuit mentioned above with respect to GD circuit 302. When Vb is above the reference voltage VR1=3.7 volts, the output of comparator is driven high, which activates transistor 310 and deactivates inverter 304. In this mode of operation GD circuit 402 generates Vd=Vb−Vf. (herein Vf is a schottky diode forwarding voltage of ~0.3V) When Vb drops below VR1=3.7 volts, the output of comparator 306 is driven low, which deactivates transistor 310 and activates inverter 304. In this mode, GD circuit generates Vd=2Vb−2Vf. (herein Vf is a PN junction diode 205, 207 forwarding voltage of ~0.7V) FIG. 4B graphically illustrates the relationship between Vd and Vb. This figure shows the transition of Vd at Vb=3.7 volts.

Figure 5A:
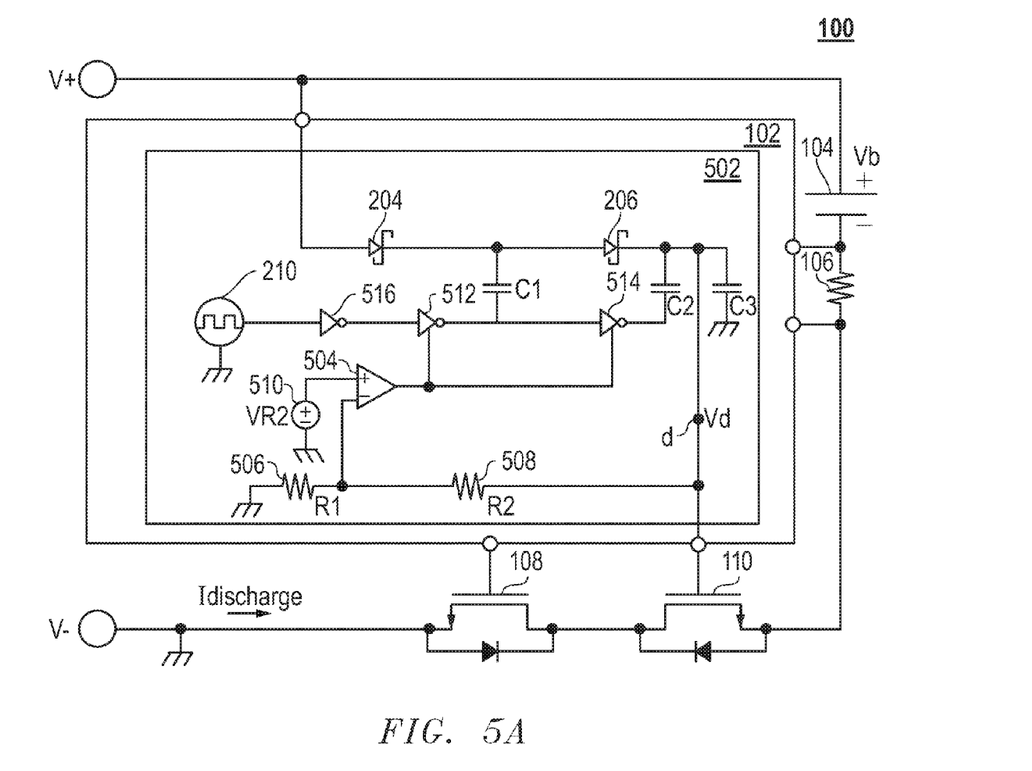
FIG. 5A illustrates in block diagram relevant components of an example GD circuit that can be employed in the BMC circuit of FIG. 1.
Figure 5B:
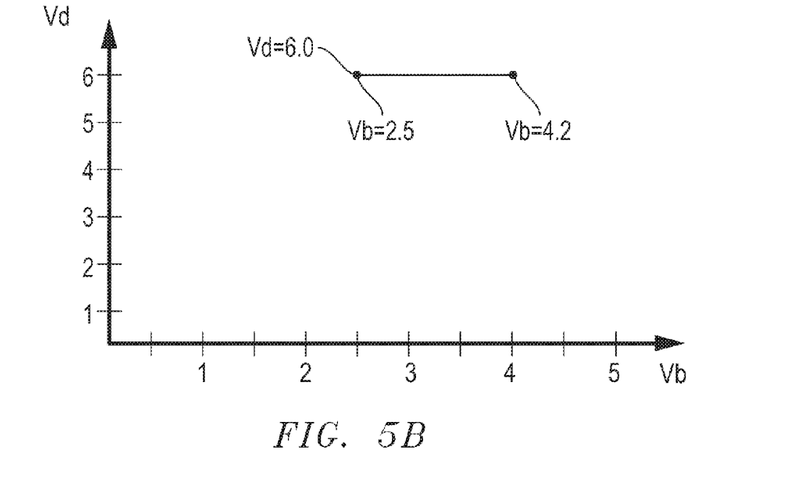
FIG. 5B graphically illustrates voltage Vd generated by the GD circuit of FIG. 5A.

FIG. 5A illustrates yet another GD circuit 502 that could be employed in the BCM 102 of FIG. 1. GD circuit 502 employs a negative feedback loop that includes operational amplifier (opamp) 504. A negative input to opamp 504 is coupled between resistors 506 and 508, which in turn is coupled to output node d. A positive input to opamp 504 is coupled to a reference voltage VR2. Opamp 504 has a large open loop voltage gain, and as a result the voltage at the positive and negative inputs will be essentially the same. With VR2=1 volt, GD circuit 502 may generate Vd=1+R2/R1, where R2 is the resistance of resistor 508 and R1 is the resistance of resistor R1. R1 and R2 should be large to reduce current flow through resistors 506 and 508. With R2=500 k ohms and R1=100 k ohms, GD circuit 502 generates Vd=6 volts when Vb varies between 2.5 volts and 4.2 volts. The output of opamp 504 is also coupled to inverters 512 and 514 so that their outputs vary between ground and Va, the output voltage of opamp 504, which in turn can vary between ground and Vb. If Vb drops below a certain voltage (e.g., 2.2 volts), GD circuit 502 may generate Vd=Vb−2Vf+2Va. Since the outputs of inventors 512 and 514 can be as high as Va, which can be as high as Vb, Vd=3Vb−2Vf. BMC circuit 102, however, should prevent Vb from dropping below 2.5 volts. As such, GD circuit 502 will generate Vd=1+R2/R1=6 volts, assuming R2=500 k ohms and R1=100 k ohms. FIG. 5B graphically illustrates the relationship between Vd and Vb for the voltage range 2.5 volts-4.2 volts. While GD circuit 502 generates a stable Vd that does not exceed the breakdown voltage of BMC circuit 102, the feedback loop may consume a relatively large amount of power.

Figure 6A:
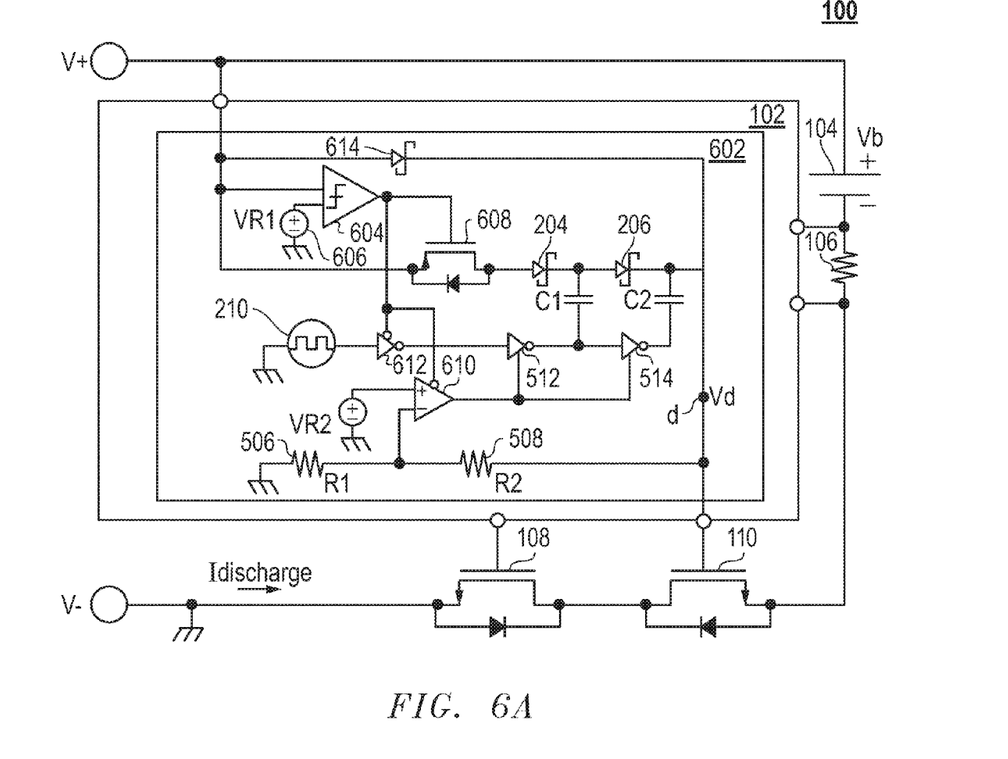
FIG. 6A illustrates in block diagram relevant components of an example GD circuit that can be employed in the BMC circuit of FIG. 1.
Figure 6B:
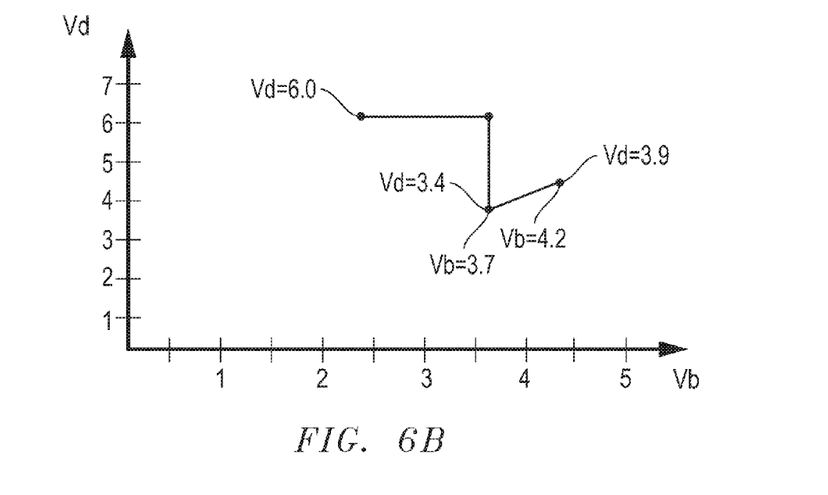
FIG. 6B graphically illustrates voltage Vd generated by the GD circuit of FIG. 6A.

FIG. 6A illustrates another GD circuit 602 that could be employed in BMC 102. GD circuit 602 includes a negative feedback loop like the negative feedback loop of GD 502. GD circuit 602 can also operate in one of two modes, one of which limits the power consumed by the feedback loop. GD circuit 602 includes a comparator circuit 604, which like the comparator circuit 306 of GD circuit 402, compares Vb to reference voltage VR1, which in this example is set to 3.7 volts. When Vb exceeds VR1=3.7 volts, the output of comparator 604 is driven high, which deactivates p-channel metal oxide field effect transistor 608, inverter 612, and opamp 610. In this mode of operation, Schottky diode 614 biases output d to Vb. When Vb drops below reference voltage VR1=3.7 volts, the output comparator 604 is driven low, which in turn activates transistor 608, opamp 610, and inverter 612. In this mode, GD circuit 602 generates Vd=1+R2/R1. FIG. 6B graphically illustrates the relationship between Vd and Vb for the voltage range 2.5 volts-4.2 volts. As shown, Vd=Vb until Vb drops below VR1=3.7 volts, at which point GD circuit 602 generates Vd=6 volts assuming R2=500 k ohms and R1=100 k ohms. Advantageously, GD circuit 602 consumes less power when the magnitude of Vb exceeds reference voltage VR1, but nonetheless Vd is sufficiently high enough to reduce Rdson of transistor 110.

Figure 7A:
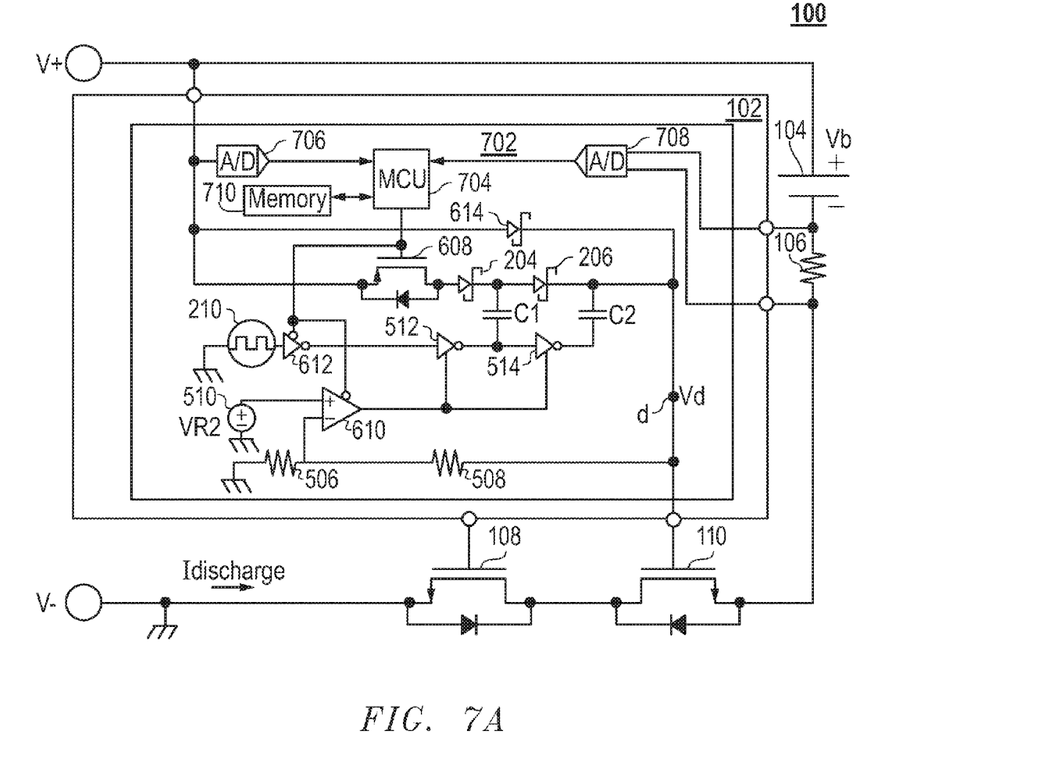
FIG. 7A illustrates in block diagram relevant components of an example GD circuit that can be employed in the BMC circuit of FIG. 1.

FIG. 7A illustrates another GD circuit 702 that can be employed in the GD 102. GD circuit 702 includes a microcontroller unit (MCU) 704 or similar device that can selectively activate or deactivate the combination of transistor 608, inverter 612, and opamp 610. GD circuit 702 also includes a pair of analog to digital (A/D) converters 706 and 708, which respectively sample analog voltages Vb and Vsense, the voltage generated across sense resistor 106, which is proportional to current Idischarge flowing therethrough. A/D convertors 706 and 708 generate digital equivalents of the sampled voltages, which are subsequently provided to and processed by MCU 704 in accordance with instructions stored in memory.

Figure 7B:
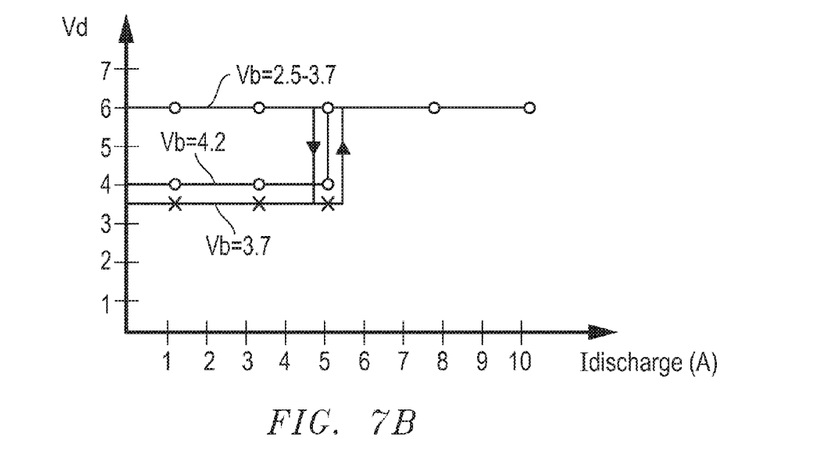
FIG. 7B graphically illustrates voltage Vd generated by the GD circuit of FIG. 7A.

MCU 704 monitors the digital equivalent of Vb and the digital equivalent of Vsense. When Vb is larger than, for example, 3.7 volts, MCU 704 will deactivate transistor 608, opamp 610, and inverter 612. In this mode of operation, GD circuit 702 will generate Vd=Vb-Vf, unless the digital equivalent of Vsense exceeds a predetermined value stored in memory 710. This may happen, for example, when the mobile device (e.g., a smart phone) enters into a data transmission mode in which it may be important for battery 100 to provide stable output power. A more stable output power can be facilitated by reducing Rdson of transistor 110. When Vsense exceeds the predetermined value, MCU 704 will activate transistor 608, opamp 610 and inverter 612. In this configuration, GD circuit 602 generates Vd=1+R2/R1 at output d. If, however, at any point Vb drops below the threshold voltage of 3.7 volts, MCU 704 will activate transistor 608, opamp 610, and inverter 612 so that the output voltage Vd is maintained at 1+R2/R1. FIG. 7B graphically illustrates the relationship between Vd and Idischarge for Vb=2.5 volts and Vb=4.2 volts.

Figure 8A:
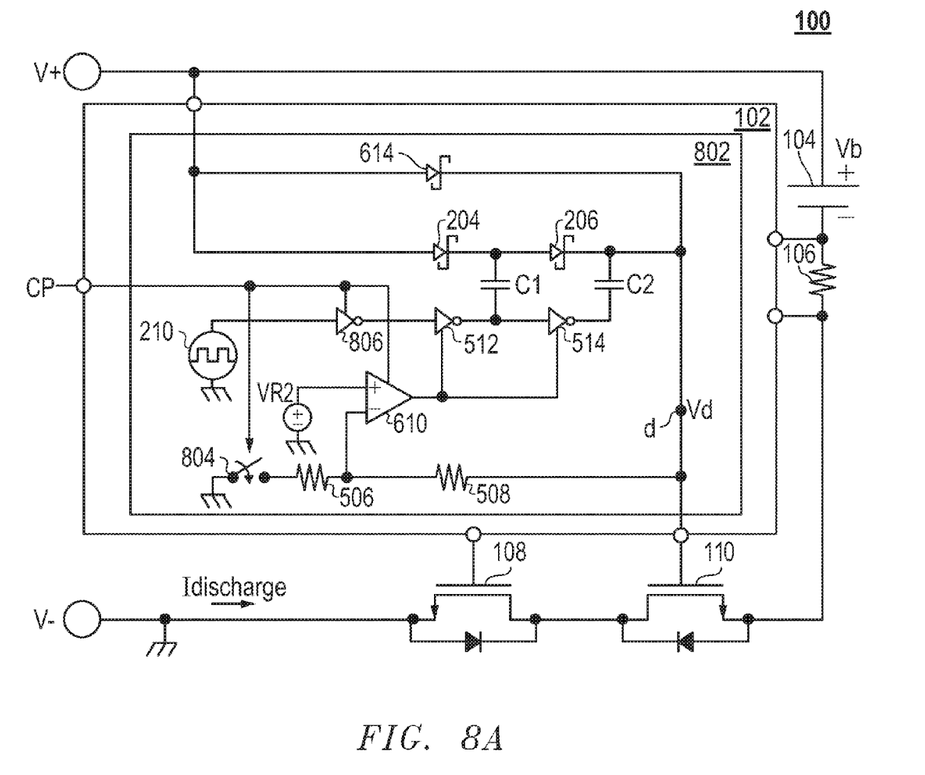
FIG. 8A illustrates in block diagram relevant components of an example GD circuit that can be employed in the BMC circuit of FIG. 1.

FIG. 8A illustrates yet another GD circuit 802 that can be employed in GD circuit 102. GD circuit 802 includes many of the components shown within the GD circuits 602 and/or 702.

Figure 8B:
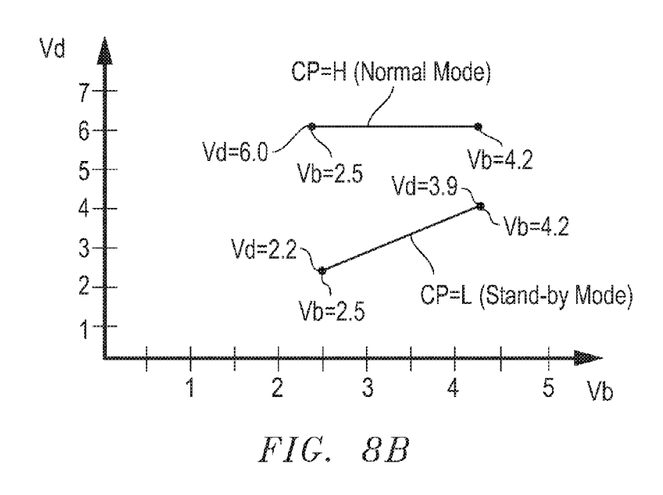
FIG. 8B graphically illustrates voltage Vd generated by the GD circuit of FIG. 8.

A few significant differences exist. For example, the GD circuit 802 lacks a component such as MCU 704 for controlling opamp 610 and inverter 806. Rather, these components and switch 804 are controlled by an external signal CP. Many mobile devices that employ rechargeable battery packs, such as the rechargeable battery pack 100 shown in FIG. 1, can operate in a stand-by mode in order to conserve the battery pack's charge. In the normal mode of operation, a mobile device may require substantial discharge current from the battery pack. To accommodate this requirement, CP can be driven high, which in turn closes switch 804 and activates opamp 610 and inverter 806. In this mold GD control circuit 802 generates Vd=1+R2/R1. With R2=500 k ohms and R1=100 k ohms, GD circuit 502 will generate Vd=6 volts, which in turn reduces Rdson of transistor 110. CP can be driven low when the mobile device is, for example, operating in a standby mode during which less power is needed from battery 104. With CP set to low, switch 804 is opened, and inverter 806 and opamp 808 are disabled. In this configuration, GD circuit 802 generates Vd=Vb-Vf. FIG. 8B graphically illustrates the relationship between Vd and Vb for the voltage range Vb=2.5 volts-Vb=4.2 volts and with CP set to high and low.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising;
   a battery generating an output voltage at a positive terminal thereof;
   an integrated circuit (IC) generating a first control voltage;
   a gate of a field effect transistor (FET) receiving the first control voltage, wherein the FET comprises a drain and a source which is cascade coupled in a portion of a current loop between a negative terminal of a battery pack and a negative terminal of the battery;
   the FET transmitting current in or out the battery in response to the gate receiving the first control voltage;
   wherein the first control voltage is greater than the output voltage;
   wherein the first control voltage is less than a breakdown voltage of the IC.

2. The method of claim 1 further comprising:
   generating a second control voltage;
   the FET transmitting current in or out the battery in response to the gate receiving the second control voltage;
   wherein the second control voltage is less than the breakdown voltage of the IC.

3. The method of claim 2 further comprising:
   comparing the output voltage to a reference voltage;
   wherein the gate receives the first control voltage if the output voltage is less than the reference voltage;
   wherein the gate receives the second control voltage if the output is greater than the reference voltage.

4. The method of claim 1 further comprising:
   comparing the output voltage to a predetermined voltage;
   deactivating the FET so that it cannot transmit current from the battery if the output voltage is less than the predetermined voltage.

5. The method of claim 1 wherein a first circuit generates the first control voltage at a constant level while the output voltage level varies.

6. The method of claim 2 further comprising:
the battery generating an output current;
generating a digital signal representing the output current;
comparing the digital signal to a predetermined value;
wherein the gate receives the first control voltage if the digital signal is less than the predetermined value;
wherein the gate receives the second control voltage if the digital signal is greater than the predetermined value.

7. The method of claim 2 further comprising:
generating a digital signal representing the output voltage;
comparing the digital signal to a predetermined value;
wherein the gate receives the first control voltage if the digital signal is less than the predetermined value;
wherein the gate receives the second control voltage if the digital signal is greater than the predetermined value.

8. An apparatus comprising:
an integrated circuit (IC) comprising a first circuit for generating a first control voltage for controlling a field effect transistor (FET);
wherein the first circuit comprises an input configured to receive an output voltage of a battery;
wherein the first control voltage is greater than the output voltage;
wherein the first control voltage is less than a breakdown voltage of the IC.

9. The apparatus of claim 8 further comprising:
a second circuit for generating a second control voltage for controlling the FET;
wherein the second voltage is less than a breakdown voltage of the IC.

10. The apparatus of claim 9 further comprising:
the battery;
the FET, wherein the FET comprises a source, drain, and gate, wherein the gate is configured to receive the first control voltage from the first circuit or the second control voltage from the second circuit, and wherein the FET is cascade connected in a portion of a current loop between a negative terminal of battery pack and a negative terminal of the battery.

11. The apparatus of claim 10 further comprising:
a comparator coupled to the first and second circuits, wherein the comparator is configured to compare the output voltage to a reference voltage;
wherein the comparator is configured to activate the first circuit and deactivate the second circuit if the output voltage is less than the reference voltage;
wherein the comparator is configured to activate the second circuit and deactivate the first circuit if the output voltage is greater than the reference voltage.

12. The apparatus of claim 8 wherein the first circuit is configured to generate the first control voltage at a constant level while the output voltage level varies.

13. The apparatus of claim 9 further comprising:
an analog-to-digital (A/D) convertor for generating a digital signal representing an output current of the battery;
a circuit for comparing the digital signal to a predetermined value;
wherein the circuit is configured to activate the first circuit and deactivate the second circuit if the digital signal is less than the predetermined value;
wherein the circuit is configured to activate the second circuit and deactivate the first circuit if the digital signal is greater than the reference predetermined value.

14. The apparatus of claim 9 further comprising:
an analog-to-digital (A/D) convertor for generating a digital signal representing the output voltage;
a circuit for comparing the digital signal to a predetermined value;
wherein the circuit is configured to activate the first circuit and deactivate the second circuit if the digital signal is less than the predetermined value;
wherein the circuit is configured to activate the second circuit and deactivate the first circuit if the digital signal is greater than the predetermined value.

15. The apparatus of claim 9:
wherein the first and second circuits are configured to receive a control signal;
wherein the first circuit is configured to generate the first voltage only if the control signal is set to a first state;
wherein the second circuit is configured to generate the second voltage only if the control signal is set to a second state.

16. An apparatus comprising:
an integrated circuit (IC) comprising a first means for generating a first control voltage for controlling field effect transistor (FET);
wherein the first means comprises an input configured to receive an output voltage of a battery;
wherein the first control voltage is greater than the output voltage;
wherein the first control voltage is less than a breakdown voltage of the IC.

17. The apparatus of claim 16 further comprising:
a second means for generating a second control voltage for controlling the FET;
wherein the second voltage is less than a breakdown voltage of the IC.

18. The apparatus of claim 17 further comprising:
the battery;
the FET, wherein the FET comprises a source, drain, and gate, wherein the gate is configured to receive the first control voltage from the first circuit or the second control voltage from the second circuit, and wherein the FET is cascade connected in a portion of a current loop between a negative terminal of a battery pack and a negative terminal of the battery.

19. The apparatus of claim 17 further comprising:
a comparator coupled to the first and second means, wherein the comparator is configured to compare the output voltage to a reference voltage;
wherein the comparator is configured to activate the first means and deactivate the second means if the output voltage is less than the reference voltage;
wherein the comparator is configured to activate the second means and deactivate the first means if the output voltage is greater than the reference voltage.

20. The apparatus of claim 9 further comprising:
the battery;
the FET, wherein the FET comprises a source, drain, and gate, wherein the gate is configured to receive the first control voltage from the first circuit or the second control voltage from the second circuit, and wherein the drain is coupled to a negative terminal of the battery.

21. A method comprising;
a battery generating an output voltage at a positive terminal thereof;
an integrated circuit (IC) generating a first control voltage;

a gate of a field effect transistor (FET) receiving the first control voltage, wherein the FET comprises a drain and a source with the source coupled to a negative terminal of the battery;

the FET transmitting current towards the battery in response to the gate receiving the first control voltage;

wherein the first control voltage is greater than the output voltage;

wherein the first control voltage is less than a breakdown voltage of the IC.

* * * * *